(12) United States Patent
Goldman et al.

(10) Patent No.: US 12,135,539 B2
(45) Date of Patent: Nov. 5, 2024

(54) SENSOR SYSTEMS PRINCIPALLY FOR SWIMMING POOLS AND SPAS

(71) Applicant: Zodiac Pool Systems LLC, Carlsbad, CA (US)

(72) Inventors: David Goldman, Carlsbad, CA (US); Hwa Heng, Carlsbad, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 380 days.

(21) Appl. No.: 16/680,381

(22) Filed: Nov. 11, 2019

(65) Prior Publication Data
US 2020/0150633 A1 May 14, 2020

Related U.S. Application Data

(60) Provisional application No. 62/758,854, filed on Nov. 12, 2018.

(51) Int. Cl.
*H05B 47/19* (2020.01)
*E04H 4/14* (2006.01)
*G05B 19/4155* (2006.01)

(52) U.S. Cl.
CPC ......... *G05B 19/4155* (2013.01); *E04H 4/148* (2013.01); *H05B 47/19* (2020.01); *G05B 2219/49217* (2013.01)

(58) Field of Classification Search
CPC ...... G05B 19/4155; G05B 2219/49217; E04H 4/148; E04H 4/1209; H05B 47/19; H05B 47/185; H04B 3/54; H04B 2203/5458; H04B 2203/5483
See application file for complete search history.

(56) References Cited

U.S. PATENT DOCUMENTS

| 7,164,364 | B2 | 1/2007 | Ares Losada | |
| 10,825,319 | B1* | 11/2020 | Madden | G06T 7/0002 |
| 2002/0163316 | A1 | 11/2002 | Lys et al. | |
| 2007/0244576 | A1* | 10/2007 | Potucek | G05D 23/1902 700/55 |
| 2008/0168599 | A1* | 7/2008 | Caudill | A61H 33/0087 4/541.1 |
| 2008/0197788 | A1* | 8/2008 | Conover | H05B 47/155 315/291 |
| 2008/0264788 | A1* | 10/2008 | Uthemann | G01N 27/283 204/412 |

(Continued)

OTHER PUBLICATIONS

International Application No. PCT/US2019/060799, International Search Report and Written Opinion mailed on Jul. 1, 2020, 15 pages.

(Continued)

*Primary Examiner* — Charles Cai
(74) *Attorney, Agent, or Firm* — Kilpatrick Townsend & Stockton LLP (57) ABSTRACT

A pool or spa control system includes a sensor system with one or more sensors in contact with a main body of water. The sensor system measures water condition data of the body of water and is mounted on a wall submerged in the main body of water. The pool or spa control system also includes a modem that facilitates data communications between the sensor system and communication equipment positioned at a different location from the main body of water.

17 Claims, 4 Drawing Sheets

(56) References Cited

U.S. PATENT DOCUMENTS

| | | | |
|---|---|---|---|
| 2009/0204263 A1 | 8/2009 | Love | |
| 2011/0163677 A1* | 7/2011 | Baret | H05B 47/185 |
| | | | 315/152 |
| 2012/0062026 A1* | 3/2012 | Raji | H04L 12/10 |
| | | | 307/31 |
| 2015/0362896 A1* | 12/2015 | Feldstein | G05B 15/02 |
| | | | 700/275 |
| 2016/0077660 A1* | 3/2016 | Frantz | G06F 3/0414 |
| | | | 345/173 |
| 2016/0164695 A1* | 6/2016 | Fabre | H04L 12/417 |
| | | | 370/254 |
| 2017/0164452 A1* | 6/2017 | Lyons, Sr. | H04B 3/542 |
| 2017/0219188 A1* | 8/2017 | Veloskey | F21V 17/02 |
| 2018/0224822 A1* | 8/2018 | Potucek | G05B 19/042 |
| 2018/0336905 A1* | 11/2018 | Kim | G10L 17/22 |
| 2019/0073889 A1 | 3/2019 | Potucek et al. | |
| 2019/0099325 A1 | 4/2019 | Ovalle | |

OTHER PUBLICATIONS

International Application No. PCT/US2019/060799, Invitation to Pay Additional Fees and, Where Applicable, Protest Fee mailed on Mar. 26, 2020, 9 pages.

International Application No. PCT/US2019/060799, International Preliminary Report on Patentability mailed on May 20, 2021, 10 pages.

U.S. Appl. No. 16/122,356, filed Sep. 5, 2018, and entitled "Select Communications and Data Aspects of Pool and Spa Equipment Such as Salt-Water Chlorinators".

European Application No. 19836153.7, Office Action mailed on Jun. 29, 2023, 5 pages.

U.S. Appl. No. 18/128,011, Non-Final Office Action mailed on Jan. 22, 2024, 13 pages.

U.S. Appl. No. 18/128,011, Final Office Action mailed on May 9, 2024, 15 pages.

Australia Patent Application No. 2019380358, First Examination Report mailed Jun. 8, 2024, 4 pages.

* cited by examiner

SENSOR SYSTEMS PRINCIPALLY FOR SWIMMING POOLS AND SPAS

CROSS-REFERENCE TO RELATED APPLICATION

This application claims the benefit of and priority to U.S. Provisional Application Ser. No. 62/758,854, filed Nov. 12, 2018, entitled "SENSOR SYSTEMS PRINCIPALLY FOR SWIMMING POOLS AND SPAS," the entire contents of which are hereby incorporated by this reference.

TECHNICAL FIELD

This invention relates to sensor systems principally for swimming pools or spas (or both) and more particularly, although not necessarily exclusively, to sensor arrays positioned within bodies of water and with which communication may occur via power-line communications (PLC) protocols.

BACKGROUND

U.S. Pat. No. 7,164,364 to Losada discloses lighting systems for use within swimming pools. A battery-powered radio remote control may be used to control light-emitting diodes (LEDs) of the systems. Radio-frequency (RF) signals from the remote control of the Losada patent are received by a modulator-receiver installed in the primary winding of a transformer and passed through the transformer to the LEDs.

"Smart floaters" also exist. These buoyant devices typically include certain sensors and batteries and float freely within swimming pools. Sensed information is transmitted wirelessly (using RF signals) from the floaters for further processing. Because the smart floaters typically are lightweight and untethered, these floaters are subject to undesired removal from the pools by people or pets. Some of the sensors contained in the floaters further may be permanently damaged if not maintained in contact with water.

Yet additionally, conventional thermometers and other sensors may be used in swimming pools and spas. These sensors may display information concerning water of a pool (e.g., water temperature) but historically are disconnected from any control system. They thus lack any transmitter or receiver and, in some cases, any power supply whatsoever. Other temperature sensors may be located within the circulatory systems of pools and measure water temperature as the water circulates. These types of sensors work only when pumps are active (so as to circulate water), and they are subject to inaccuracies because the temperature of water within the circulatory system may differ materially from that of water within the swimming pool.

SUMMARY

The terms "disclosure," "the disclosure," "this disclosure" and "the present disclosure" used in this patent are intended to refer broadly to all of the subject matter of this patent and the claims below. Statements containing these terms should be understood not to limit the subject matter described herein or to limit the meaning or scope of the patent claims below. Embodiments of the subject matter covered by this patent are defined by the claims below, not this summary. This summary is a high-level overview of various aspects of the subject matter of the present disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In an example, a pool or spa control system includes a sensor system with one or more sensors in contact with a main body of water. The sensor system measures water condition data of the body of water and is mounted on a wall submerged in the main body of water. The pool or spa control system also includes a modem that facilitates data communications between the sensor system and communication equipment positioned at a different location from the main body of water.

In an additional example, a sensor system includes a housing with a first inductive coupling that is electrically coupled to a power line. The power line enables transmission of electrical power from a transformer to the first inductive coupling and data communications from a modem to the first inductive coupling using a power-line communication protocol. The sensor system also includes a cartridge with a second inductive coupling and a first sensor. The cartridge receives the electrical power and the data communications at the second inductive coupling from the first inductive coupling.

In an additional example, a method for controlling a sensor system includes transmitting electrical power from a transformer to a sensor along a power line, where the sensor is in contact with a body of water. The method also includes transmitting data communications from a modem to the sensor along the power line using a power-line communication protocol. Further, the method includes receiving sensor readings of the sensor at the modem from the power line.

In an additional example, a sensor system for a swimming pool or spa communicates with a lighting system or a sensor system using a power-line communication technique.

In an additional example, a pool or spa control system includes a sensor system located in or adjacent a main body of water and having wired electrical connections with a transformer and a modem assembly.

DETAILED DESCRIPTION

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Sensors and systems of the present invention may avoid some or all of the difficulties described in the background section. In some embodiments of the invention, an array of one or more sensors may be positioned within (or nearby) a main body of water and connected by wire to a source of electrical power. Data communication to and from the array may occur using the wired power connection, providing a more reliable and permanent communications mechanism than are provided by batteries and RF systems, for example. At least part of the wired connection may utilize techniques described in the Losada patent, although other PLC protocols may be employed instead.

Figure 1:
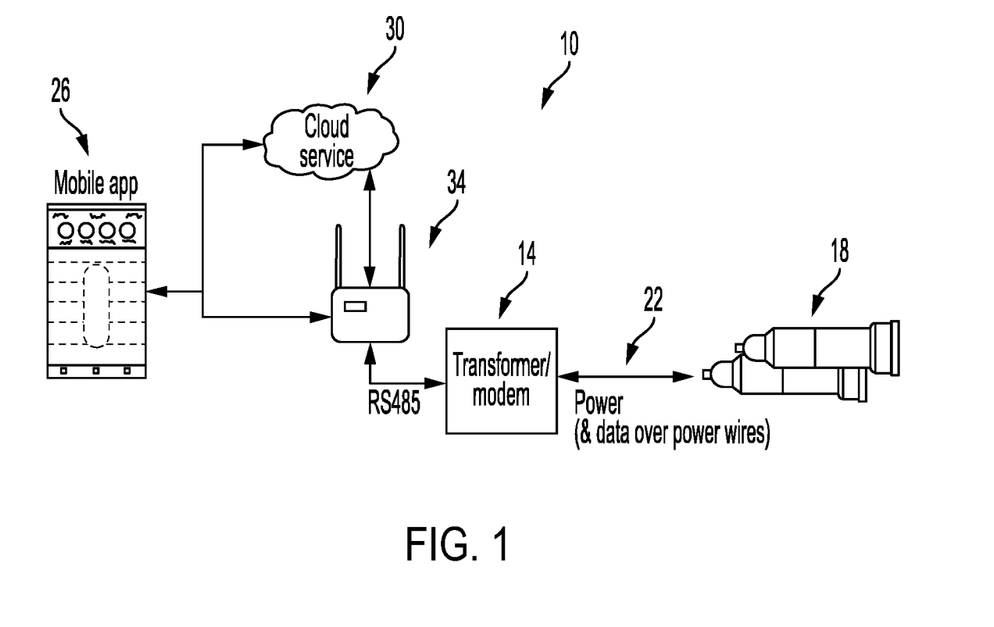
FIG. 1 is a schematic diagram of an example of a system using power-line communication (PLC) protocols to operate a color light within a swimming pool or spa, according to certain embodiments of the present disclosure.
Figure 2:
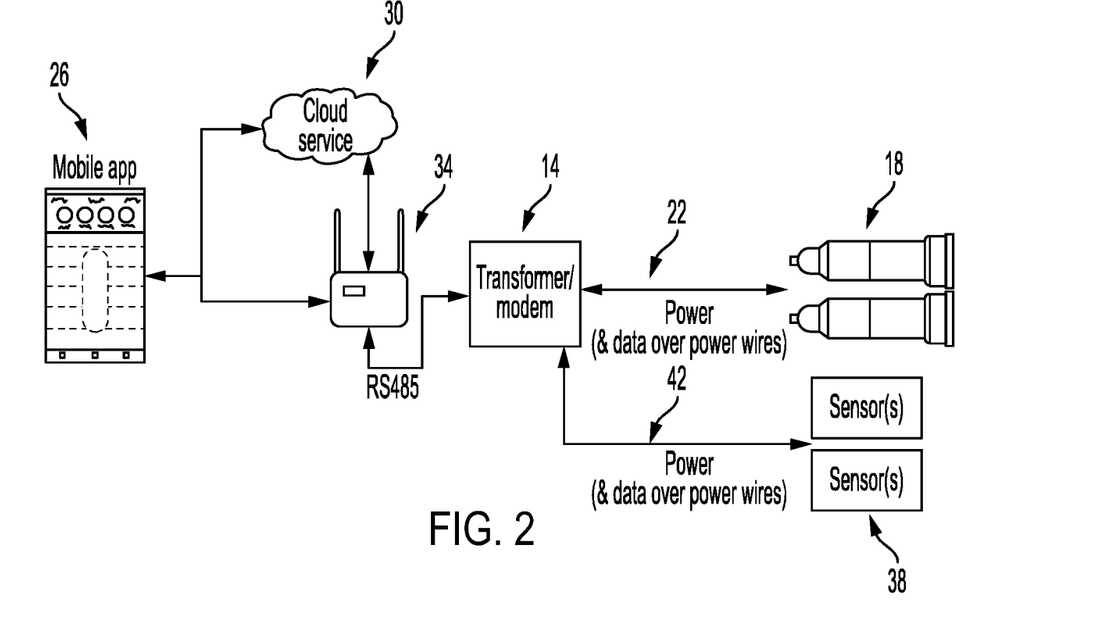
FIG. 2 is a schematic diagram of an example of a system using PLC protocols to operate both a light and one or more sensors, according to certain embodiments of the present disclosure.

FIGS. 1-2 illustrate exemplary aspects of systems of the present invention. FIG. 1 is shown as using power-line communication (PLC) protocols to operate a color light within a swimming pool or spa, whereas FIG. 2 uses such communications to operate both a light and one or more sensors. As depicted in FIG. 1, system 10 may include device 14 incorporating at least a transformer and a modem. The transformer of the device 14 may function to decrease the voltage of an incoming supply of electricity so as to provide one or more lights 18 with electricity at the decreased voltage. The modem of the device 14 operates to modulate data (information) onto a voltage waveform output by the transformer to the lights 18. Alternatively, other modulation techniques may be employed.

Although both the transformer and modem are illustrated jointly in FIGS. 1-2, they need not necessarily exist in the same housing. Any appropriate wired connection 22 may exist between the device 14 and the lights 18. The incoming supply of electricity to the device 14 may be any suitable source. Often (but not necessarily always) the incoming supply of electricity will be 115V alternating current (AC) from a main residential or commercial supply. The transformer of the device 14 typically (but not necessarily) steps down the voltage to, e.g., 24V AC so as to power the lights 18. For example, the transformer may provide electrical power at a stepped down voltage to objects or assemblies in contact with the main body of pool or spa water.

Control information for the lights 18 likewise may come from any suitable source. FIG. 1 illustrates a software application (app) 26, which may be installed on a mobile smartphone, through which a human user may supply control information. The control information from the app 26 may be transmitted to the device 14 via the internet 30 and a controller 34. Alternatively, information from the app 26 may be transmitted directly to the controller 34. Any of such transmissions may be wireless or wired. For example, the mobile smartphone running the app 26 may be communicatively coupled to the controller 34 using a Bluetooth connection when the mobile smartphone is within Bluetooth communication range of the controller 34. In another example, the controller 34 may include a wired connection or a docking station capable of providing a communication link between the smartphone running the app 26 and the controller 34. The controller 34 may include a processor and a memory, such as a non-transitory computer-readable medium. The memory may store instructions that are executable by the processor for the processor to perform operations described herein. Further, communication equipment enabling communication between the device 14 (e.g., a transformer/modem assembly) and the controller 34 may include RS-485 or Zigbee protocols, as examples.

In addition to or instead of powering the lights 18, the device 14 may power one or more sensors 38, as shown in FIG. 2. In this case, a wired connection 42 exists between the device 14 and the sensors 38. That is, the sensors 38 are not "free-floating" sensors within the pool or spa. Via the wired connection 42, the sensors 38 may receive electrical power and data from the device 14. Suitable equipment additionally may be present in the device 14, the controller 34, or both so as to receive information from the sensors 38 via the connection 42. Further, the sensors 38 may be located in or adjacent main bodies of water of pools or spas. Non-limiting examples of information which may be provided by sensors 38 include: temperature of water in the pool or spa (measurable even when an associated pool circulation pump is not operating); pressure (allowing detection of the depth of the sensor and, in turn, the water level in the pool or spa); pH of the water; oxidation reduction potential (ORP) of the water; conductivity of the water; stray current in the water; levels of dissolved oxygen ($O_2$) or other gasses in the water; turbidity of the water; hardness of the water; alkalinity of the water; chlorine level in the water; phosphate level in the water; lumens level in the water; any other feature of the water chemistry; and/or chloramines/halogenated disinfection by-products. A set of sensors 38 may provide a pool or a spa with a sensor system capable of providing data relating to water conditions within, or other aspects of, the swimming pool or spa.

The sensors 38 may include a communication component, such as a modem, that is able to modulate data (information) onto the voltage waveform of the wired connection 42. The communication component may provide a mechanism for the sensors 38 to communicate information that is detected by the sensors 38 to the smart phone running the app 26 or to other devices that are controlling pool or spa operations. For example, the sensors 38 may modulate data onto the voltage waveform indicating a temperature of water within a pool. The temperature information may be displayed within the app 26 on the smartphone, and the temperature information may also be relayed to a heating controller of the pool for use in controlling operation of a heating element. Information from other sensors 38, such as chemical sensors, may also be communicated by the communication component along the wired connection 42. In such an example, the information from the chemical sensors may be provided to a chemical controller that is able to adjust distribution of chemicals to the pool or spa based on the information transmitted along the wired connection 42 from the sensors 38.

Figure 3:
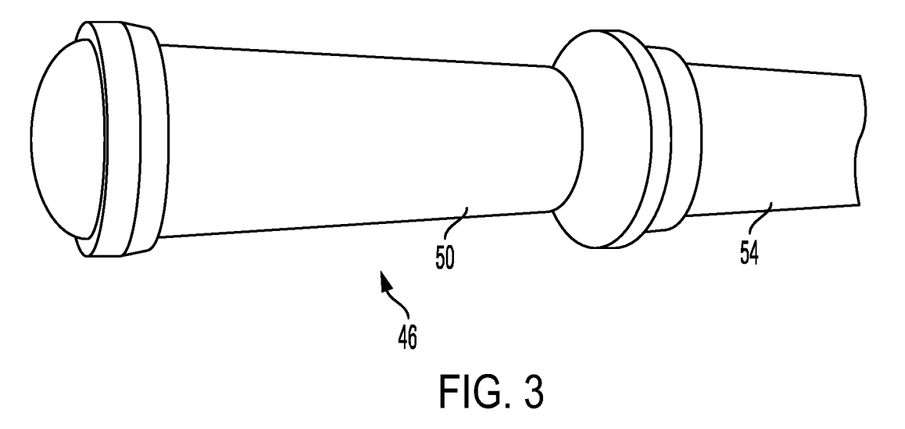
FIG. 3 is an example of an assembly and a housing for a light or sensor used in the systems of FIGS. 1 and 2, according to certain embodiments of the present disclosure.

FIG. 3 depicts alternate aspects of the invention. An assembly 46 is shown as including cartridge 50 and housing 54, the latter of which preferably is installed on or in a swimming pool or spa. The cartridge 50 may be communicatively and electrically coupled to the housing 54 via an inductive coil, through which data also may pass. The cartridge 50 also may contain one or more of the lights 18 and/or the sensors 38. In an example, the cartridge 50 includes both a light 18 and a sensor 38. In some versions of the invention, the cartridge 50 may be easily removable from the housing 54 for repair or replacement.

A control signal from the components of the cartridge 50 (e.g., a light 18, a sensor 38, or both), may receive power and control signals through the inductive coil in the housing 54. As discussed above with respect to FIGS. 1 and 2, the housing 54 may receive the power and data through a wired connection (such as wired connection 22) with the device 14, which may include the transformer and the modem. The transformer of the device 14 may transform power from a main residential power supply, a commercial power supply, or any other suitable power supply into a power output that is suitable for use by the cartridge 50. Further, the modem of the device 14 may apply the control signals, which are used to control the components of the cartridge 50, to the wired connection 22 between the cartridge 50 and the device 14. In this manner, the components of the cartridge 50 are both powered and controlled by the wired connection 22. In an example, the modem facilitates data communications to and from the cartridge 50 using PLC protocols or any other data transmission techniques across the wired connection 22 (i.e., a power line).

Further, the cartridge 50 may include a communication component, such as a modem, that is able to modulate data (information) onto the voltage waveform received at the housing 54. The communication component may provide a mechanism for the sensors 38 of the cartridge 50 to communicate information that is detected by the sensors 38 to the smart phone running the app 26 or to other devices that are controlling pool or spa operations. For example, the sensors 38 may modulate data onto the voltage waveform indicating a temperature of water within a pool. The temperature information may be displayed within the app 26 on the smartphone, and the temperature information may also be relayed to a heating controller of the pool for use in controlling operation of a heating element. Information from other sensors 38, such as chemical sensors, within the cartridge 50 may also be communicated by the communication component along the wired connection 22. In such an example, the information from the chemical sensors may be provided to a chemical controller that is able to adjust distribution of chemicals to the pool or spa based on the information transmitted along the wired connection 22 from the sensors 38.

Additionally, because the cartridge 50 receives power and data from the inductive coil of the housing 54, the cartridge 50 is easily removable from the housing 54 for repair or replacement. For example, when a sensor 38 or a light 18 within the cartridge 50 malfunctions or otherwise stops working, the cartridge 50 is removable and replaceable within the housing 54 without pulling long lengths of cord through a conduit.

Figure 4:
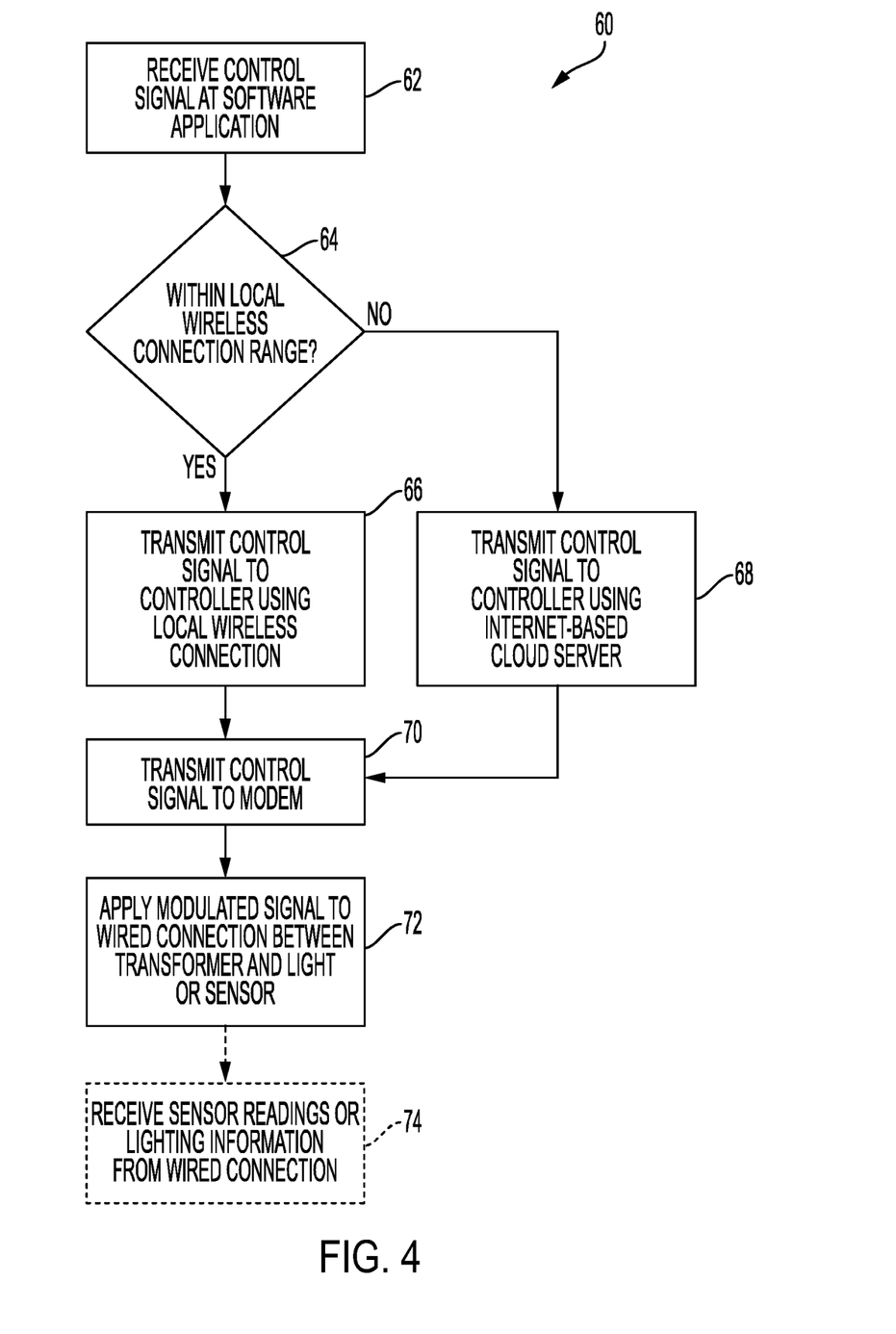
FIG. 4 is a flow chart of a process for communicating with lights or sensors using PLC protocols, according to certain embodiments of the present disclosure.

FIG. 4 is a flow chart of a process 60 for communicating with the lights 18 and/or sensors 38 using PLC protocols. At block 62, the process 60 involves receiving a control signal from a user at the software application 26. In an example, the control signal may include a signal instructing the lights 18 to a particular light output (e.g., color, lumens, on/off, etc.) or a signal requesting a sensor reading from the sensors 38. Other control signals relating to the lights 18 and the sensors 38 may also be received at the software application 26.

At block 64, the process 60 involves determining whether the software application is within a local wireless connection range to the controller 34. For example, a mobile smartphone running the software application 26 may be capable of wirelessly connecting with the controller 34 using a Bluetooth connection or other wireless standard connection when the mobile smartphone is within a wireless connection range of the controller 34.

If the software application 26 is being run on a device within wireless range of the controller 34, at block 66 the process 60 involves transmitting the control signal from the software application 26 to the controller 34 using a wireless connection. If the software application 26 is being run on a device that is not in wireless range of the controller 34, at block 68 the process 60 involves transmitting the control signal from the software application 26 to the controller 34 using an internet-based cloud server. For example, the mobile device may transmit the control signal to a cloud server using a wired or wireless connection to the internet 30, and the controller 34 may receive the control signal from the cloud server through a wired or wireless connection to the internet 30.

At block 70, the process 60 involves transmitting the control signal from the controller 34 to the modem of the device 14. The modem may receive the control signal and prepare modulated data signal packets for application onto the wired connections 22 and 42.

At block 72, the process 60 involves applying the modulated data signals to the wired connections 22 and 42. The wired connections 22 and 42 may also provide a path for transmission of the power from the transformer of the device 14 to the lights 18 and the sensors 38. Thus, the modulated data signals are transmitted along the wired connections 22 and 42 that also provide a power transmission path for the lights and the sensors 38.

At block 74, the process 60 optionally involves receiving sensor readings or lighting information from the wired connections 22 and 42 at the modem of the device 14. The modem can demodulate the sensor readings or the lighting information and distribute the information to appropriate devices associated with the pool or spa. For example, the modem can provide the information to the controller 34, and the controller 34 can distribute the information to the software application 26 for display to a user. Similarly, the controller 34 can distribute the information from the sensors 38, for example, to pool or spa controllers capable of adjusting processes that affect the readings of the sensors 38 (e.g., a pool heater, a chemical distributor, etc.).

Embodiments of the present invention thus may include components such as a transformer which may provide electrical power to objects or assemblies in contact with the main body of pool water. The invention may also include a modem facilitating data communications to and from the objects and assemblies preferably using PLC techniques. Further, the invention may include a sensor system capable of providing data relating to water conditions within, or other aspects of, a swimming pool or spa. Optional lights which, like the sensors or other objects or assemblies, may receive power and operating instructions via PLC may also be included as components of the invention. Additionally, the invention may include equipment allowing communication between the transformer/modem assembly and a pool controller or internet-based cloud service.

The equipment allowing the communication between the transformer/modem assembly and the pool controller or the internet-based cloud service may utilize RS-485 or Zigbee protocols, as examples. Optionally, the sensor system may utilize an inductive coupling to pass power and data to sensors (and receive data from sensors), with the sensors being easily disconnectable from a housing and removable without pulling long wires through a pool conduit. Non-limiting examples of information which may be provided by sensors include: temperature of water in the pool or spa (measurable even when an associated pool circulation pump is not operating); pressure (allowing detection of the depth of the sensor and, in turn, the water level in the pool or spa); pH of the water; ORP of the water; conductivity of the water; stray current in the water; levels of dissolved oxygen ($O_2$) or other gasses in the water; turbidity of the water; hardness of the water; alkalinity of the water; chlorine level in the water; phosphate level in the water; lumens level in the water; any other feature of the water chemistry; chloramines/halogenated disinfection by-products; or any combination thereof.

Exemplary concepts or combinations of features of the invention may include a sensor system for a swimming pool or spa which communicates using PLC protocol. The exemplary concepts or combinations of features of the invention may also include non-free-floating sensor systems for pools or spas configured to receive modulated power signals. Further, the exemplary concepts or combinations of features of the invention may include sensor systems located in or adjacent main bodies of water of pools or spas and having wired electrical connections with transformer/modem assemblies.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

The entire contents of the Losada patent are incorporated herein by this reference. Also incorporated herein by this reference are the entire contents of U.S. patent application Ser. No. 16/122,356, filed Sep. 5, 2018, and entitled "Select Communications and Data Aspects of Pool and Spa Equipment Such as Salt-Water Chlorinators." Further, although applicant has described devices and techniques for use principally with swimming pools, persons skilled in the relevant field will recognize that the present invention may be employed in connection with other objects and in other manners. Finally, references to "pools" and "swimming pools" herein may also refer to spas or other water containing vessels used for recreation or therapy and having components with which communications are needed or desired.

In the following, further examples are described to facilitate the understanding of the subject matter of the present disclosure:

As used below, any reference to a series of examples is to be understood as a reference to each of those examples disjunctively (e.g., "Examples 1-4" is to be understood as "Examples 1, 2, 3, or 4").

Example 1 is a pool or spa control system, comprising: a sensor system comprising one or more sensors in contact with a main body of water, wherein the sensor system is configured to measure water condition data of the body of water, and wherein the sensor system is mounted on a wall submerged in the main body of water; and a modem configured to facilitate data communications between the sensor system and communication equipment positioned at a different location from the main body of water.

Example 2 is the pool or spa control system of example 1, wherein the data communications between the sensor system and the communication equipment comprises power line communication.

Example 3 is the pool or spa control system of examples 1-2, further comprising: a transformer configured to provide electrical power to the sensor system.

Example 4 is the pool or spa control system of example 3, further comprising a power line electrically coupling the transformer to the sensor system, wherein the modem facilitates the data communications between the sensor system and the communication equipment over the power line.

Example 5 is the pool or spa control system of example 4, further comprising: a housing comprising a first inductive coupling that is electrically coupled to the power line; and a cartridge comprising a second inductive coupling and a first sensor of the one or more sensors, wherein the cartridge is configured to receive the electrical power and the data communications at the second inductive coupling from the first inductive coupling.

Example 6 is the pool or spa control system of examples 1-5, wherein the sensor system further comprises a lighting device.

Example 7 is the pool or spa control system of example 6, further comprising: a first power line electrically coupling a transformer to the sensor system, wherein the modem facilitates the data communications between the sensor system and the communication equipment over the first power line; and a second power line electrically coupling the transformer to the lighting device, wherein the modem facilitates the data communications between the light device and the communication equipment over the second power line.

Example 8 is the pool or spa control system of examples 1-7, further comprising: a controller configured to receive control instructions from a mobile device or an internet-based cloud service; and the communication equipment configured to provide control signals from the controller to the modem for transmission of the data communications to the sensing system.

Example 9 is the pool or spa control system of example 8, wherein the communication equipment provides the control signals to the modem using RS-485 or Zigbee protocols.

Example 10 is the pool or spa control system of examples 1-9, wherein the body of water comprises a main body of pool or spa water.

Example 11 is the pool or spa control system of example 1-10, wherein the sensor system is configured to provide an indication of temperature of the body of water, pressure at the sensor system, pH of the body of water, oxidation reduction potential (ORP) of the body of water, conductivity of the body of water, stray current in the body of water, levels of dissolved oxygen (O2) or other gasses in the body of water, turbidity of the body of water, hardness of the body of water, alkalinity of the body of water, chlorine level in the body of water, phosphate level in the body of water, lumens level in the body of water, chloramines/halogenated disinfection by-products in the body of water, or any combination thereof.

Example 12 is a sensor system, comprising: a housing comprising a first inductive coupling that is electrically coupled to a power line, wherein the power line is configured to enable transmission of electrical power from a transformer to the first inductive coupling and data communications from a modem to the first inductive coupling using a power-line communication protocol; and a cartridge comprising a second inductive coupling and a first sensor, wherein the cartridge is configured to receive the electrical power and the data communications at the second inductive coupling from the first inductive coupling.

Example 13 is the sensor system of example 12, wherein the cartridge further comprises a light source that is controllable by the data communications from the modem.

Example 14 is the sensor system of examples 12-13, wherein the cartridge is positionable within a main body of pool or spa water, and wherein the cartridge is configured to transmit an indication of temperature of the main body of pool or spa water, pressure at the cartridge, pH of the main body of pool or spa water, oxidation reduction potential (ORP) of the main body of pool or spa water, conductivity of the main body of pool or spa water, stray current in the main body of pool or spa water, levels of dissolved oxygen (O2) or other gasses in the main body of pool or spa water, turbidity of the main body of pool or spa water, hardness of the main body of pool or spa water, alkalinity of the main body of pool or spa water, chlorine level in the main body of pool or spa water, phosphate level in the main body of pool or spa water, lumens level in the main body of pool or spa water, chloramines/halogenated disinfection by-products in the main body of pool or spa water, or any combination thereof to the housing using the second inductive coupling.

Example 15 is the sensor system of examples 12-14, wherein the data communications from the modem comprise instructions for the cartridge to operate the first sensor.

Example 16 is the sensor system of examples 12-15, wherein the cartridge is replaceable with an additional cartridge comprising a second sensor.

Example 17 is a method for controlling a sensor system, comprising: transmitting electrical power from a transformer to a sensor along a power line, wherein the sensor is in contact with a body of water; transmitting data communications from a modem to the sensor along the power line using a power-line communication protocol; and receiving sensor readings of the sensor at the modem from the power line.

Example 18 is the method of example 17, wherein the sensor readings comprise an indication of temperature of the body of water, pressure at the sensor, pH of the body of water, oxidation reduction potential (ORP) of the body of water, conductivity of the body of water, stray current in the body of water, levels of dissolved oxygen (O2) or other gasses in the body of water, turbidity of the body of water, hardness of the body of water, alkalinity of the body of water, chlorine level in the body of water, phosphate level in the body of water, lumens level in the body of water, chloramines/halogenated disinfection by-products in the body of water, or any combination thereof.

Example 19 is the method of examples 17-18, further comprising: transmitting electrical power from the transformer to a lighting device along a second power line, wherein the lighting device is in contact with the body of water; and transmitting the data communications from the modem to the lighting device along the second power line using the power-line communication protocol to control the lighting device.

Example 20 is the method of examples 17-19, further comprising: demodulating the sensor readings from the power line using the power-line communication protocol; and distributing demodulated sensor readings to controllers of a pool or spa system for use in controlling processes of the pool or spa system.

Example 21 is a sensor system for a swimming pool or spa that communicates with a lighting system or a sensor system using a power-line communication technique.

Example 22 is a pool or spa control system, comprising: a sensor system located in or adjacent a main body of water and having wired electrical connections with a transformer and a modem assembly.

Different arrangements of the components depicted in the drawings or described above, as well as components and steps not shown or described are possible. Similarly, some features and sub-combinations are useful and may be employed without reference to other features and sub-combinations. Embodiments of the presently disclosed subject matter have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. A pool or spa control system comprising:
   a sensor system comprising one or more sensors in contact with a main body of water, wherein the sensor system is configured to measure water condition data of the main body of water, and wherein the sensor system is mounted on a wall submerged in the main body of water;
   first housing comprising a first inductive coupling that is electrically coupled to a power line; and
   a second housing comprising a second inductive coupling and a first sensor of the one or more sensors, wherein the second housing is configured to receive electrical power and data communications at the second inductive coupling from the first inductive coupling.

2. The pool or spa control system of claim 1, further comprising:
   a device comprising housing with a transformer and a modem therein, the modem configured to facilitate data communications between the sensor system and communication equipment positioned at a different location from the main body of water, wherein the transformer is configured to provide electrical power to the sensor system; and
   the power line electrically coupling the transformer to the sensor system, wherein the modem facilitates the data communications between the sensor system and the communication equipment over the power line.

3. The pool or spa control system of claim 2, wherein the data communications between the sensor system and the communication equipment comprise power-line communication.

4. The pool or spa control system of claim 2, wherein the sensor system further comprises a lighting device.

5. The pool or spa control system of claim 4, further comprising:
   the power line as a first power line electrically coupling the transformer to the sensor system, wherein the modem facilitates the data communications between the sensor system and the communication equipment over the first power line; and
   a second power line electrically coupling the transformer to the lighting device, wherein the modem facilitates the data communications between the light device and the communication equipment over the second power line.

6. The pool or spa control system of claim 2, further comprising:
   a controller configured to receive control instructions from a mobile device or an internet-based cloud service; and
   the communication equipment configured to provide control signals from the controller to the modem for transmission of the data communications to the sensor system.

7. The pool or spa control system of claim 6, wherein the communication equipment provides the control signals to the modem using RS-485 or Zigbee protocols.

8. The pool or spa control system of claim 2, wherein the sensor system is configured to provide an indication of temperature of the body of water, pressure at the sensor system, pH of the body of water, oxidation reduction potential (ORP) of the body of water, conductivity of the body of water, stray current in the body of water, levels of dissolved oxygen (O$_2$) or other gasses in the body of water, turbidity of the body of water, hardness of the body of water, alkalinity of the body of water, chlorine level in the body of water, phosphate level in the body of water, lumens level in the body of water, chloramines/halogenated disinfection by-products in the body of water, or any combination thereof.

9. A sensor system, comprising:
a first housing comprising a first inductive coupling that is electrically coupled to a power line, wherein the power line is configured to enable transmission of electrical power from a transformer to the first inductive coupling and data communications from a modem to the first inductive coupling using a power-line communication protocol; and
a second housing comprising a second inductive coupling and a first sensor, wherein the second housing is configured to receive the electrical power and the data communications at the second inductive coupling from the first inductive coupling.

10. The sensor system of claim 9, wherein the second housing further comprises a light source that is controllable by the data communications from the modem.

11. The sensor system of claim 9, wherein the second housing is positionable within a main body of pool or spa water, and wherein the second housing is configured to transmit an indication of temperature of the main body of pool or spa water, pressure, pH of the main body of pool or spa water, oxidation reduction potential (ORP) of the main body of pool or spa water, conductivity of the main body of pool or spa water, stray current in the main body of pool or spa water, levels of dissolved oxygen (O$_2$) or other gasses in the main body of pool or spa water, turbidity of the main body of pool or spa water, hardness of the main body of pool or spa water, alkalinity of the main body of pool or spa water, chlorine level in the main body of pool or spa water, phosphate level in the main body of pool or spa water, lumens level in the main body of pool or spa water, chloramines/halogenated disinfection by-products in the main body of pool or spa water, or any combination thereof to the first housing using the second inductive coupling.

12. The sensor system of claim 9, wherein the data communications from the modem comprise instructions for the second housing to operate the first sensor.

13. The sensor system of claim 9, wherein the second housing is replaceable with an additional housing comprising a second sensor.

14. A method for controlling a sensor system, comprising:
determining whether a software application is within a range relative to a controller of a sensor;
determining a type of connection from a plurality of types of connections between the software application and the controller based on the software application being within the range or out of the range, wherein, responsive to the software application being within the range, the type of connection comprises a first type of connection of the plurality of types of connections, and wherein, responsive to the software application out of the range, the type of connection comprises a second type of connection of the plurality of types of connections different from the first type of connection;
transmitting electrical power from a transformer to the sensor along a power line, wherein the sensor is in contact with a body of water;
transmitting data communications from a modem to the sensor along the power line using a power-line communication protocol;
receiving sensor readings measured by the sensor at the modem from the power line; and
receiving, from the software application and by the controller, a control signal using the determined type of connection.

15. The method of claim 14, wherein the sensor readings comprise an indication of temperature of the body of water, pressure at the sensor, pH of the body of water, oxidation reduction potential (ORP) of the body of water, conductivity of the body of water, stray current in the body of water, levels of dissolved oxygen (O$_2$) or other gasses in the body of water, turbidity of the body of water, hardness of the body of water, alkalinity of the body of water, chlorine level in the body of water, phosphate level in the body of water, lumens level in the body of water, chloramines/halogenated disinfection by-products in the body of water, or any combination thereof.

16. The method of claim 14, further comprising:
transmitting electrical power from the transformer to a lighting device along a second power line, wherein the lighting device is in contact with the body of water; and
transmitting the data communications from the modem to the lighting device along the second power line using the power-line communication protocol to control the lighting device.

17. The method of claim 14, further comprising:
demodulating the sensor readings from the power line using the power-line communication protocol; and
distributing demodulated sensor readings to controllers of a pool or spa system for use in controlling processes of the pool or spa system.

* * * * *